US011029575B2

(12) United States Patent
Giri

(10) Patent No.: US 11,029,575 B2
(45) Date of Patent: Jun. 8, 2021

(54) SINGLE COMPONENT ELECTROCHROMIC DEVICE HAVING A TUNABLE IR FILTER

(71) Applicant: Gentex Corporation, Zeeland, MI (US)

(72) Inventor: Punam Giri, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 174 days.

(21) Appl. No.: 16/235,811

(22) Filed: Dec. 28, 2018

(65) Prior Publication Data

US 2019/0204703 A1 Jul. 4, 2019

Related U.S. Application Data

(60) Provisional application No. 62/612,143, filed on Dec. 29, 2017.

(51) Int. Cl.
| | | |
|---|---|---|
| *G02F 1/157* | (2006.01) | |
| *G02F 1/15* | (2019.01) | |
| *C09K 9/02* | (2006.01) | |
| *G02F 1/1516* | (2019.01) | |
| *G02F 1/1514* | (2019.01) | |

(52) U.S. Cl.
CPC .............. *G02F 1/157* (2013.01); *C09K 9/02* (2013.01); *G02F 1/15* (2013.01); *G02F 1/1516* (2019.01); *C09K 2211/1051* (2013.01); *G02F 2001/1502* (2013.01); *G02F 2001/15145* (2019.01)

(58) Field of Classification Search
CPC .......... G02F 1/157; G02F 1/15; G02F 1/1516; G02F 2001/1502; G02F 2001/15145; C09K 9/02; C09K 2211/1051

USPC .................................................. 359/265–275
See application file for complete search history.

(56) References Cited

U.S. PATENT DOCUMENTS

| | | | |
|---|---|---|---|
| 4,297,401 A | 10/1981 | Chern et al. | |
| 4,418,102 A | 11/1983 | Ferrato | |
| 4,695,490 A | 9/1987 | McClelland et al. | |
| 4,902,108 A | 2/1990 | Byker | |
| 5,596,023 A | 1/1997 | Tsubota et al. | |
| 5,596,024 A | 1/1997 | Horie et al. | |

(Continued)

FOREIGN PATENT DOCUMENTS

| | | | |
|---|---|---|---|
| WO | 2015183821 A1 | 12/2015 | |
| WO | 2016145120 A1 | 9/2016 | |

(Continued)

OTHER PUBLICATIONS

Alex Kistenmacher et al Synthesis of New Soluble Triphenodithiazines and Investigation of Their Donor Properties. Chemische Berichte, 125(6), 1992, pp. 1495, 1496, left col., compounds 6-8.

(Continued)

*Primary Examiner* — Tuyen Tra
(74) *Attorney, Agent, or Firm* — Price Heneveld LLP; Bradley D. Johnson

(57) ABSTRACT

An electro-optic cell for an electrochromic device includes an electrochromic medium including an electrochromic compound M having at least one reduced state and at least one oxidized state. The electrochromic compound M can act as both the anodic material and the cathodic material in the electro-optic cell. The electrochromic medium can be capable of reversibly attenuating transmittance of light having a wavelength within a predetermined range.

20 Claims, 7 Drawing Sheets

(56) References Cited

U.S. PATENT DOCUMENTS

| | | |
|---|---|---|
| 5,818,625 A | 10/1998 | Forgette et al. |
| 6,157,480 A | 12/2000 | Anderson et al. |
| 6,186,505 B1 | 2/2001 | Lomprey et al. |
| 6,426,492 B1 * | 7/2002 | Bos .......................... G01J 1/04 |
| | | 250/208.1 |
| 6,445,486 B1 | 9/2002 | Lomprey et al. |
| 6,597,489 B1 | 7/2003 | Guarr et al. |
| 6,700,692 B2 | 3/2004 | Tonar et al. |
| 6,710,906 B2 | 3/2004 | Guarr et al. |
| 6,714,334 B2 | 3/2004 | Tonar |
| 7,372,611 B2 | 5/2008 | Tonar et al. |
| 7,428,091 B2 | 9/2008 | Baumann et al. |
| 8,274,729 B2 | 9/2012 | Luten et al. |
| 9,500,927 B2 | 11/2016 | Kloeppner et al. |
| 2002/0141032 A1 | 10/2002 | Guarr et al. |
| 2012/0147447 A1 * | 6/2012 | Noh ....................... C25D 15/00 |
| | | 359/265 |
| 2018/0105738 A1 | 4/2018 | Giri |

FOREIGN PATENT DOCUMENTS

| | | |
|---|---|---|
| WO | 2017087019 A1 | 5/2017 |
| WO | 2018075533 A1 | 4/2018 |

OTHER PUBLICATIONS

Database Regestry [online] RN 1835339-58-6, Dec. 22, 2015, Retrieved from STN.

Database Regestry [online] RN 1835339-79-1, Dec. 22, 2015, Retrieved from STN.

* cited by examiner

SINGLE COMPONENT ELECTROCHROMIC DEVICE HAVING A TUNABLE IR FILTER

CROSS-REFERENCE TO RELATED APPLICATION

This application claims priority to and the benefit under 35 U.S.C. § 119(e) of U.S. Provisional Application No. 62/612,143, filed on Dec. 29, 2017, entitled "SINGLE COMPONENT ELECTROCHROMIC DEVICE HAVING A TUNABLE IR FILTER," the disclosure of which is hereby incorporated herein by reference in its entirety.

TECHNOLOGICAL FIELD

The present technology generally relates to electrochromic compounds and electro-optics devices, and more particularly, relates to single component electrochromic compounds and devices that incorporate them.

BACKGROUND

Near infrared, or "NIR" is defined as electromagnetic radiation in the range of about 700-1400 nm. Most commercial electrochromic systems have been designed to attenuate only the visible portion of the solar spectrum. Since solar energy is, on the average, 7.9% ultraviolet (UV), 45.5% visible radiation, and 46.7% near-infrared (NIR) radiation, over one-half of the total solar energy is not in the visible portion of the spectrum. Addressing exposure to the near infrared portion of the electromagnetic spectrum could be advantageous in some types of electrochromic devices.

SUMMARY

According to one aspect of the present disclosure, an electro-optic cell is provided. The electro-optic cell can include an anodic surface, a cathodic surface, and an electrochromic medium. The electrochromic medium includes an electrochromic compound M acting as both an anodic material and a cathodic material, wherein the electrochromic compound has at least one reduced state and at least one oxidized state. The electrochromic medium is capable of reversibly attenuating transmittance of light having a wavelength within a predetermined range.

According to another aspect of the present disclosure, a non-segregated one component electrochromic device is provided. The non-segregated one component electrochromic device includes an anodic surface, a cathodic surface, and a chamber defined at least in part by the anodic and cathodic surfaces. The chamber includes an electrochromic medium that includes an anodic material and a cathodic material comprising an electrochromic compound M. The electrochromic compound M is reversibly oxidizable to at least one oxidized state and reversibly reducible to at least one reduced state.

According to another aspect of the present disclosure, an electrochromic medium for use in a single component electrochromic device is provided. The electrochromic medium includes an electrochromic compound of Formula (I):

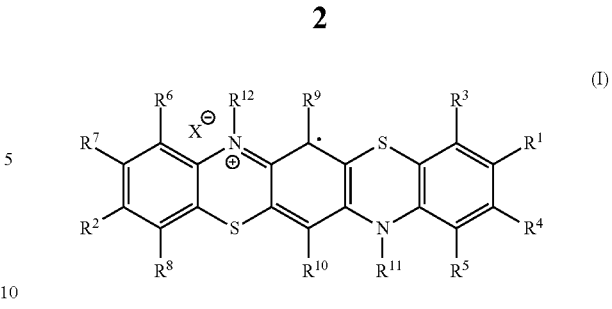

wherein the electrochromic compound of Formula (I) can be reversibly reduced to form a reduced species of Formula (II):

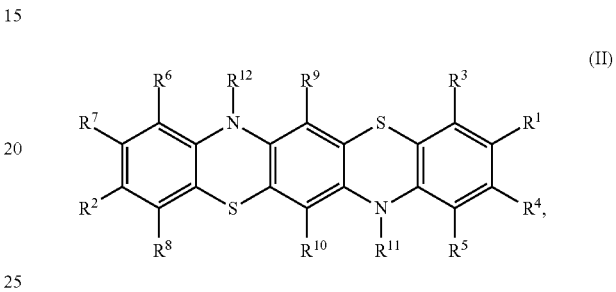

and wherein the electrochromic compound of Formula (I) can be reversibly oxidized to form an oxidized species of Formula (III):

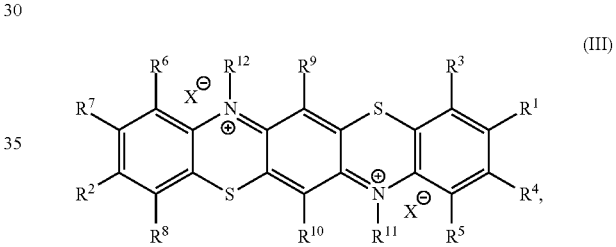

wherein: $R^1$ and $R^2$ are individually alkyl, aryl, alkoxy, or aryloxy; $R^3$, $R^4$, $R^5$, $R^6$, $R^7$, $R^8$ are individually H, alkyl, aryl, alkoxy, or aryloxy; $R^9$ and $R^{10}$ are individually alkoxy, or aryloxy, or where $R^1$ and $R^2$ are alkyl, $R^9$ and $R^{10}$ are individually H, alkyl, alkoxy, or aryloxy; $R^{11}$ and $R^{12}$ are individually alkyl. $(CH_2CH_2O)_nOCH_3$, or $(CH_2)_nN^+(R^{20})_3$ [X], wherein n is from 1 to 20; each $R^{20}$ is individually alkyl; and X is an anion.

These and other features, advantages, and objects of the present disclosure will be further understood and appreciated by those skilled in the art upon studying the following specification, claims, and appended drawings.

DETAILED DESCRIPTION

Figure 1:
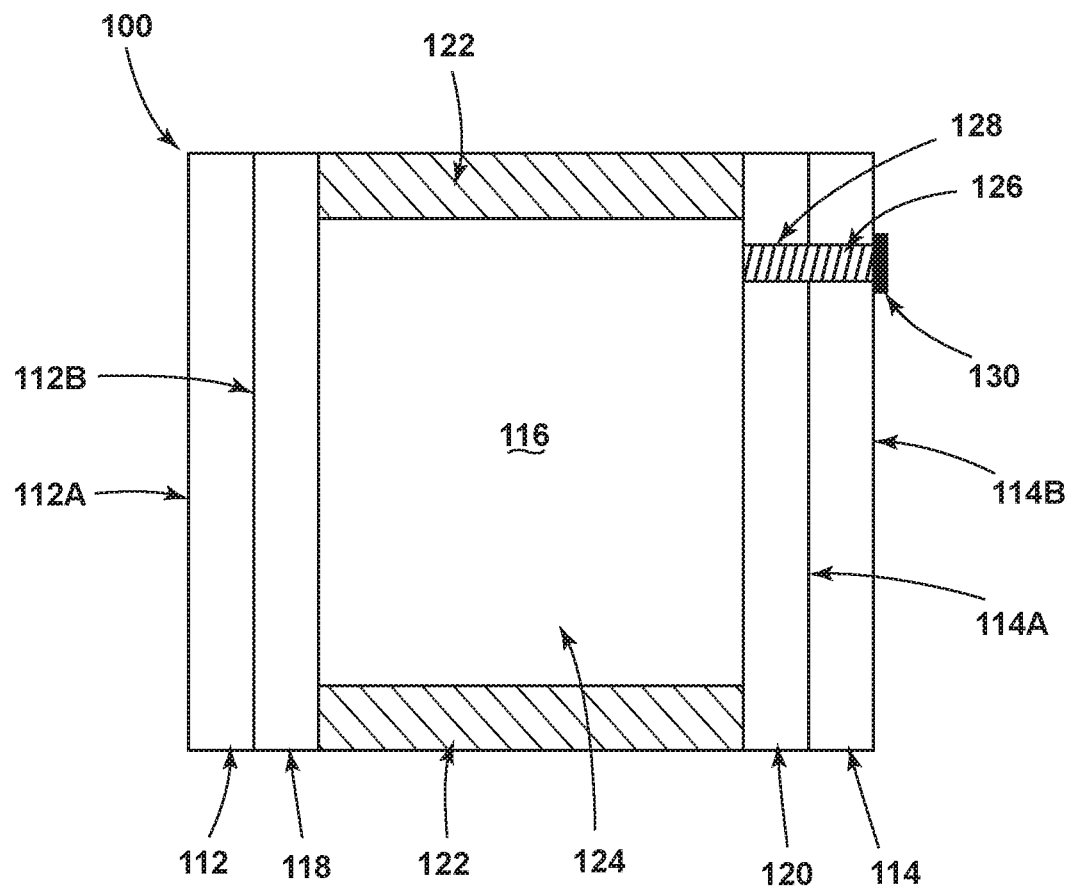
FIG. 1 is a cross-sectional schematic representation of an electrochromic device, according to one aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be constructed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In one aspect, the present disclosure relates to a family of electrochromic compounds capable of attenuating the transmittance of at least a portion of the electromagnetic spectrum. According to another aspect, the electrochromic compounds of the present disclosure can be utilized in an electrochromic medium of an electrochromic device to reversibly attenuate the transmittance of a predetermined range of wavelengths of the electromagnetic spectrum.

A conventional electrochromic medium in an electro-optic cell contains an anodic compound and a cathodic compound. Aspects of the present disclosure relate to electrochromic devices, cells, mediums, and methods of making and using that utilize one electroactive compound to act as both the anodic compound and the cathodic compound in the electrochromic medium.

A conventional electrochromic cell contains an anodic compound, for example, dimethyl phenazine, and a cathodic compound, for example, a viologen. When the electrochromic cell is powered, the anodic compounds lose electrons to form oxidized compounds and the cathodic compounds accept electrons to form reduced compounds. The cycling performance of the device can be dependent on the stability of the oxidized and/or reduced compounds. Degradation of the oxidized and/or reduced compounds during cycling can significantly reduce the lifetime of the corresponding electrochromic device.

According to an aspect of the present disclosure, a material that can function as both the anodic and the cathodic material in an electrochromic cell is provided. The material of the present disclosure can be both reduced and oxidized to provide the reduced and oxidized materials formed when the electrochemical cell is powered. According to one aspect, an electrochromic compound M can be provided which has at least one reduced state ($M_{reduced}$) and at least one oxidized state ($M_{oxidized}$), and thus the electrochromic compound M is capable of acting as both the anodic material and the cathodic material in the electrochromic cell.

In one aspect of the present disclosure, the electrochromic compound M is selected from a family of triphenodithiazines which are capable of acting as both an anodic material and a cathodic material in an electrochromic cell. According to another aspect, a family of triphenodithiazines is provided which are capable of acting as both an anodic material and a cathodic material in an electrochromic cell in addition to being capable of selectively absorbing radiation having a predetermined wavelength. In one example, the electrochromic cell is capable of selectively absorbing radiation having a wavelength in the near infra-red (NIR) region of the electromagnetic spectrum. The materials of the present disclosure may decrease the likelihood of degradation of the oxidized and/or reduced compounds formed during cycling, which may improve the stability of the electrochromic device over time. The materials of the present disclosure may also provide improvements in the switching time of the electrochromic device.

Referring to FIGS. 1-6, an electrochromic device having an electro-optic cell is provided. The electrochromic device includes an electrochromic medium including an electrochromic compound M of Formula (I) that can function as both an anodic material and a cathodic material:

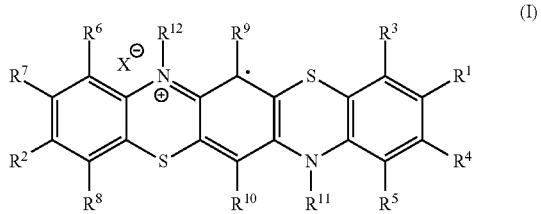

(I)

wherein: $R^1$ and $R^2$ are individually alkyl, aryl, alkoxy, or aryloxy; $R^3$, $R^4$, $R^5$, $R^6$, $R^7$, $R^8$ are individually H, alkyl, aryl, alkoxy, or aryloxy; $R^9$ and $R^{10}$ are individually alkoxy, or aryloxy, or where $R^1$ and $R^2$ are alkyl, $R^9$ and $R^{10}$ are individually H, alkyl, alkoxy, or aryloxy; $R^{11}$ and $R^{12}$ are individually alkyl, $(CH_2CH_2O)_nOCH_3$, or $(CH_2)_nN^+(R^{20})_3$ [X], wherein n is from 1 to 20; each $R^{20}$ is individually alkyl; and X is an anion.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like. Such substitution includes solubility enhancing groups as described in U.S. Pat. No. 6,445,486, issued Sep. 3, 2002 and entitled "Electroactive Materials and Beneficial Agents having a Solubilizing Moiety," the contents of which are incorporated herein by reference in its entirety.

As used herein, $C_m$-$C_n$, such as $C_1$-$C_{12}$, $C_1$-$C_8$, or $C_1$-$C_6$ when used before a group refers to that group containing m to n carbon atoms.

As used herein, "alkyl" groups include straight chain and branched alkyl groups having from 1 to about 20 carbon atoms, and typically from 1 to 12 carbons or, in some aspects, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups may further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups may also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6 to14 carbons, and in others from 6 to 12 or even 6 to 10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

"TFSI" as used herein refers to bis(trifluoromethanesulfonyl) imide, as illustrated by the molecule below:

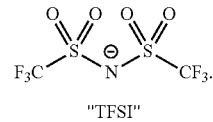

"TFSI"

In some embodiments, X may be F$^-$, Cl$^-$, Br$^-$, I$^-$, BF$_4^-$, PF$_6^-$, SbF$_6^-$, AsF$_6^-$, ClO$_4^-$, SO$_3$CF$_3^-$, N(CN)$_2^-$, N(CF$_3$SO$_2$)$_2^-$, C(CF$_3$SO$_2$)$_3^-$, N(SO$_2$C$_2$F$_5$)$_2^-$, Al(OC(CF$_3$)$_3$)$_4^-$ or BAr$_4^-$, wherein Ar is an aryl or fluorinated aryl group. In some embodiments, X$^-$ is $^-$BAr$_4$ and Ar is a pentafluorophenyl group. In other embodiments, X$^-$ is a tetrafluoroborate or a bis(trifluoromethylsulfonyl) imide anion. When X$^-$ is shown as a counterion for any of the compounds disclosed herein, multiple X's may be used as a mixture of two or more different anions.

Referring now to FIG. 1, a schematic representation of an electrochromic device is provided. The electrochromic device 100 includes first substrate 112 having a first surface 112A and a second surface 112B, and a second substrate 114 having a third surface 114A and a fourth surface 114B. The second surface 112B and the third surface 114A have associated therewith conductive surfaces 118 and 120, respectively. The first substrate 112 and the second substrate 114, along with a sealing member 122 define a chamber 116 for containing an electrochromic medium 124. The electrochromic device 100 also includes one or more plugs 126 and 130 associated with one or more fill ports 128. The one or more fill ports 128 may be disposed within the first substrate 112, the second substrate 114, or the sealing member 122. Upon mounting as a mirror, window, filter, or other device, the electrochromic device 100 may optionally include a bezel (not shown) that extends around a periphery of at least one of the first substrate 112 and/or the second substrate 114 to conceal and/or protect components of the electrochromic device and the like, such as a bus connector (if present), the sealing member 122, one or more plugs 126 and 130, and/or the one or more fill ports 128.

Several other electrochromic device configurations are contemplated for use, including, but not limited to, those disclosed in U.S. Pat. No. 5,818,625, issued Oct. 6, 1998 and entitled "Electrochromic Rearview Mirror Incorporating a Third Surface Metal Reflector,"; U.S. Pat. No. 6,597,489, issued Jul. 22, 2003 and entitled "Electrode Design for Electrochromic Devices,"; and U.S. Pat. No. 6,700,692, issued Mar. 2, 2004 and entitled "Electrochromic Rearview Mirror Assembly Incorporating a Display/Signal Light,", all of which are hereby incorporated herein by reference in their entirety including all references incorporated therein.

According to an aspect of the present disclosure, the first substrate 112 may be fabricated from any one of a number of materials that are transparent or substantially transparent to light having a wavelength in the visible and optionally NIR regions of the electromagnetic spectrum, such as, for example, borosilicate glass, soda lime glass, or polymeric materials such as natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as cyclic olefin copolymers commercially available from TOPAS® Advanced Polymers.

In another aspect, the first substrate 112 is fabricated from a sheet of glass or polymeric material having a thickness ranging from about 0.10 millimeters (mm) to about 12.7 mm. This may include any range of thickness such as from about 0.50 mm to about 1.50 mm, or from about 0.65 mm to about 1.00 mm. The thickness of the first substrate 112 may be based upon the particular application of the electrochromic device. While particular substrate materials have been disclosed, for illustrative purposes only, it will be understood that numerous other substrate materials are likewise contemplated for use, so long as the materials are at least substantially transparent and exhibit appropriate physical properties, such as strength, to be able to operate effectively in conditions of intended use. Indeed, electrochromic devices in accordance with the present disclosure can be, during normal operation, exposed to extreme temperature variation as well as substantial UV radiation, emanating primarily from the sun. It will be further understood that first substrate 112 and/or second substrate 114 may comprise a UV absorbing layer and/or contain a UV absorbing material (not shown) to help protect the substrate(s) 112, 114 and/or the electrochromic media 124 from UV damage.

In some aspects, the second substrate 114 may be fabricated from similar materials as that of the first substrate 112, or where transparency of the second substrate 114 is not desired, the second substrate 114 may be a metal or polymeric material. The second substrate 114 is fabricated from a sheet of glass or plastic having a thickness ranging from about 0.10 mm to about 12.7 mm. This may include thicknesses from about 0.50 mm to about 1.50 mm, or from about 0.65 mm to about 1.00 mm. If the first and second substrates 112, 114 are fabricated from sheets of glass, then the glass can optionally be tempered, heat strengthened, chemically strengthened, and/or laminated prior to or subsequent to being coated with layers of electrically conductive material.

One or more layers of an electrically conductive material used to form the conductive surface 118 may be associated with the second surface 112B of the first substrate 112. These layers serve as an electrode for the electrochromic device 100. The electrically conductive material is desirably a material that includes one or more of the following features: (a) is substantially transparent to light in the visible and/or NIR region of the electromagnetic spectrum; (b) bonds reasonably well to the first substrate 112; (c) maintains the bond to the first substrate 112 when associated with a sealing member 122; (d) is generally resistant to corrosion from materials contained within the electrochromic device 100 or the atmosphere; and/or (e) exhibits minimal diffuse or specular reflectance as well as sufficient electrical conductance. It is contemplated that the electrically conductive material may be fabricated from fluorine doped tin oxide (FTO), for example TEC™ glass, indium/tin oxide (ITO), doped zinc oxide, indium zinc oxide, metal oxide/metal/ metal oxide (wherein metal oxide can be substituted with metal carbide, metal nitride, metal sulfide, etc.), or other materials known to those having ordinary skill in the art.

One or more layers of an electrically conductive material made of the same or different materials as those associated with the second surface 112B of the first substrate 112 may additionally be associated with the third surface 114A of the second substrate 114. The electrically conductive material may be operatively bonded to the electrically conductive material associated with the first substrate 112 by the sealing member 122. Once bonded, the sealing member 122, plug 126 and/or the juxtaposed portions of conductive surfaces 118, 120 may serve to generally define an inner peripheral geometry of the chamber 116. Alternatively, edge sealing techniques may be utilized which are disclosed in U.S. Pat. No. 7,372,611, issued May 13, 2008 and entitled "Vehicular Rearview Mirror Elements and Assemblies Incorporating these Elements," the contents of which are incorporated herein by reference in their entirety.

In some aspects, the first and second substrates 112, 114 may be substantially transparent and have a cell distance of less than 600 µm. In other aspects, the first substrate 112 and second substrate 114 may have a cell distance of about 150 µm to about 600 µm, about 200 µm to about 300 µm, about 225 µm to about 275 µm, or ranges between any two of these values (including endpoints). In still other aspects, the first substrate 112 and second substrate 114 may have a cell distance of about 350 µm, 300 µm, 275 µm, 250 µm, 225 µm, 200 µm, 175 µm, 150 µm, 125 µm, 100 µm, 90 µm, 80 µm, 70 µm, 60 µm, 50 µm, 40 µm, 30 µm, 20 µm, 10 µm, or ranges between any two of these values (including endpoints). In still more aspects, the first substrate 112 and the second substrate 114 may have a cell distance of about 250 µm.

In some aspects, the sealing member 122 may include any material that is configured to adhesively bond to the electrically conductive materials or conductive surfaces 118, 120 coated on the first and second substrate 112, 114 to, in turn, seal the chamber 116, (in certain aspects in cooperation with the plug 126 and fill port 128) so that electrochromic medium 124 does not inadvertently leak out of the chamber 116 or be exposed to the outside atmosphere. It is also contemplated that the sealing member 122 extends all the way to the second surface 112B and third surface 114A of the first and second substrates 112, 114, respectively. In such aspects, the layers of conductive surfaces 118, 120 coated on the first and second substrates 112, 114 may be partially removed where the sealing member 122 is positioned. If the conductive surfaces 118, 120 are not associated with their respective first and second substrates 112, 114, then the sealing member 122 preferably bonds well to the material of the first and second substrates 112, 114. It will be understood that sealing member 122 can be fabricated from any one of a number of materials including, for example, those disclosed in U.S. Pat. No. 4,297,401, issued Oct. 27, 1981 and entitled "Liquid Crystal Display and Photopolymerizable Sealant Therefor,"; U.S. Pat. No. 4,418,102, issued Nov. 29, 1983 and entitled "Liquid Crystal Displays having Improved Hermetic Seal,"; U.S. Pat. No. 4,695,490, issued Sep. 22, 1987 and entitled "Seal for Liquid Crystal Display,"; U.S. Pat. No. 5,596,023, issued Jan. 21, 1997 and entitled "Sealing Material for Liquid Crystal Display Panel, and Liquid Crystal Display Panel Using It,"; U.S. Pat. No. 5,596,024, issued Jan. 21, 1997 and entitled "Sealing Composition for Liquid Crystal,"; U.S. Pat. No. 6,157,480, issued Dec. 5, 2000 and entitled "Seal for Electrochromic Device,"; and U.S. Pat. No. 6,714,334, issued Mar. 30, 2004 and entitled "Electrochromic Device having a Seal including an Epoxy Resin Cured with a Cycloaliphatic Amine," the contents of which are incorporated herein by reference in their entirety.

According to one aspect of the present disclosure, the electrochromic devices 100 disclosed herein can be single or one component devices where the electrochromic medium 124 of the electrochromic device 100 includes a compound M having at least one reduced state $M_{reduced}$ and at least one oxidized state $M_{oxidized}$, and is thus capable of acting as both the anodic and cathodic material in the device. In one aspect, the compound M includes at least one or more of the family of triphenodithiazine electrochromic compounds of the present disclosure which can each be reversibly oxidized and reversibly reduced and thus can act as both the anodic and cathodic compounds of the electrochromic device 100. The "single component device" or "one component device" as used herein, is defined as a device including an electrochromic compound M having at least one oxidized state $M_{oxidized}$ and at least one reduced state $M_{reduced}$ and which acts as both the anodic material and the cathodic material in the device.

According to an aspect of the present disclosure, the chamber may be defined as the space between opposing conductive surfaces of the device, with the electrochromic medium in the chamber in electrical contact with both of the conductive surfaces of the device. With reference to the particular example of FIG. 1, the chamber 116 is defined by the first conductive surface 118 of the first substrate 112, the second conductive surface 120 of the second substrate 114, and the sealing member 122 coupling the first substrate 112 to the second substrate 114. Optionally, the first and second substrates 112, 114 may be off-set relative to one another to facilitate electrical contact between the first and second conductive surfaces 118, 120 (illustrated in FIG. 3).

According to one aspect of the present disclosure, the electrochromic compound M used in the electrochemical cell of the electrochromic device 100 is capable of absorbing radiation having a predetermined wavelength or range of wavelengths. In one aspect, the electrochromic device 100 is capable of absorbing radiation having a predetermined wavelength within the visible region of the electromagnetic spectrum. In another aspect, the electrochromic device 100 is capable of absorbing radiation having a predetermined wavelength within the NIR region of the electromagnetic spectrum. In another aspect, the electrochromic device 100 is capable of absorbing radiation having a predetermined wavelength that overlaps with a portion of the visible and NIR regions of the electromagnetic spectrum. In one example, the compound M is a NIR absorbing triphenodithiazine compound. Preferably, the NIR absorbing triphenodithiazine compounds used in the electrochromic device 100 are stable when subjected to ultraviolet (UV) light and thermal cycling. The triphenodithiazine compounds may exhibit higher oxidation and reduction potentials than some conventional anodic and cathodic compounds, and because of these higher potentials, the compounds may be less air-sensitive for handling and in devices constructed with the materials. The triphenodithiazine NIR absorbing compounds of the present disclosure may exist in one of three oxidation states: (1) a first oxidation state (e.g., neutral state) where the triphenodithiazine is a reduced material ($M_{reduced}$ oxidation state), an exemplary embodiment of which is provided by Formula (A) below:

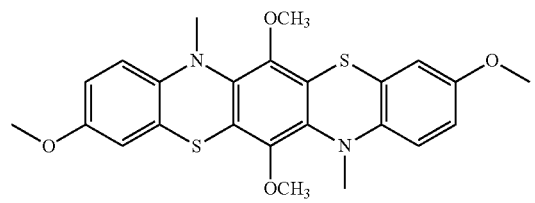

(A)

(2) a second oxidation state (e.g., oxidation to a radical cation) where the triphenodithiazine can function as both an anodic material and a cathodic material that can be reversibly oxidized or reduced (an electrochemical compound of oxidation state M), an exemplary embodiment of which is provided by Formula (B) below:

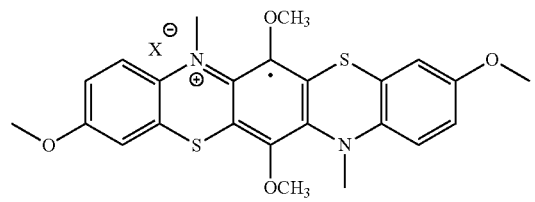

(B)

and (3) a third oxidation state (e.g., oxidation to a di-cation) where the triphenodithiazine is an oxidized material ($M_{oxidized}$ oxidation state), an exemplary embodiment of which is provided by Formula (C) below:

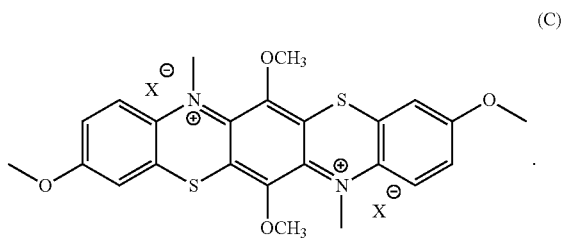

(C)

Figure 4:
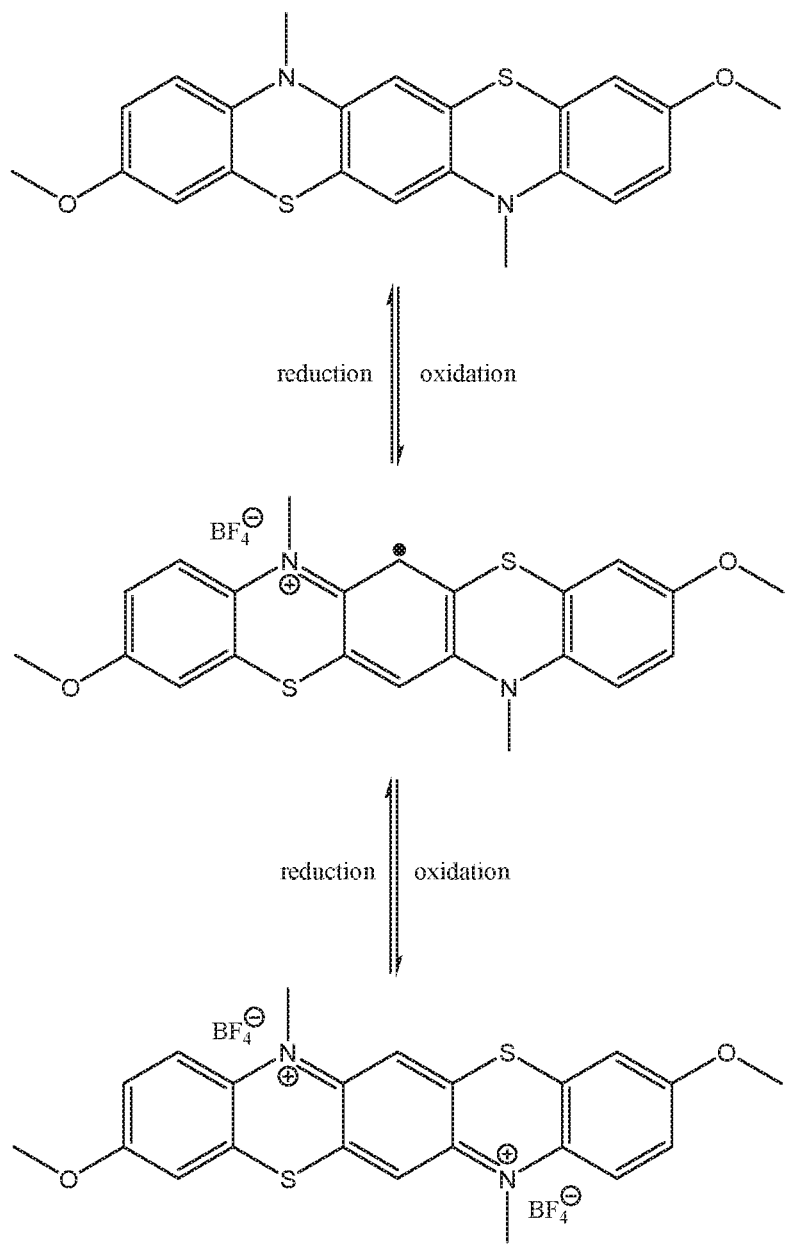
FIG. 4 depicts a non-limiting example of a triphenodithiazine in a first oxidation state, a second oxidation state, and a third oxidation state according to one aspect of the present disclosure.

A non-limiting example of another triphenodithiazine NIR absorbing compound in its first ($M_{reduced}$), second (M), and third oxidation ($M_{oxidized}$) states is provided in FIG. 4. Other triphenodithiazine compounds of Formula (I) according to the present disclosure may have oxidation states similar to those illustrated in FIG. 4, even for the different substituent groups of Formula (I). The oxidation states of the triphenodithiazine compound of FIG. 4 are provided for exemplary reasons for the purpose of discussion and the particular nature of each oxidation state is not meant to be limiting.

A non-limiting example of a NIR absorbance spectra utilizing an electrochemical cell according to an aspect of the present disclosure, which could be used in an IR filter device, for example, was collected for an exemplary triphenodithiazine NIR absorbing compound. A 1 inch by 3 inch electrochromic device according to FIG. 1 was prepared using 3,10-dimethoxy-7,14-(4-triethyl ammonium butyl) triphenodithiazine tri(tetrafluoroborate), shown in Formula (IV) below, where $NEt_3$ is a triethyl amine group and $BF_4^-$ is a tetrafluoroborate anion.

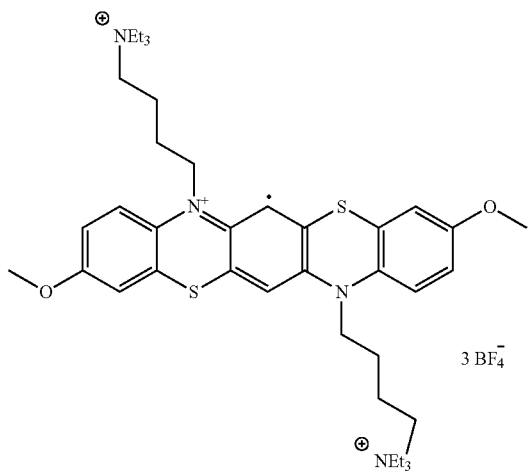

Formula (IV)

Figure 5:
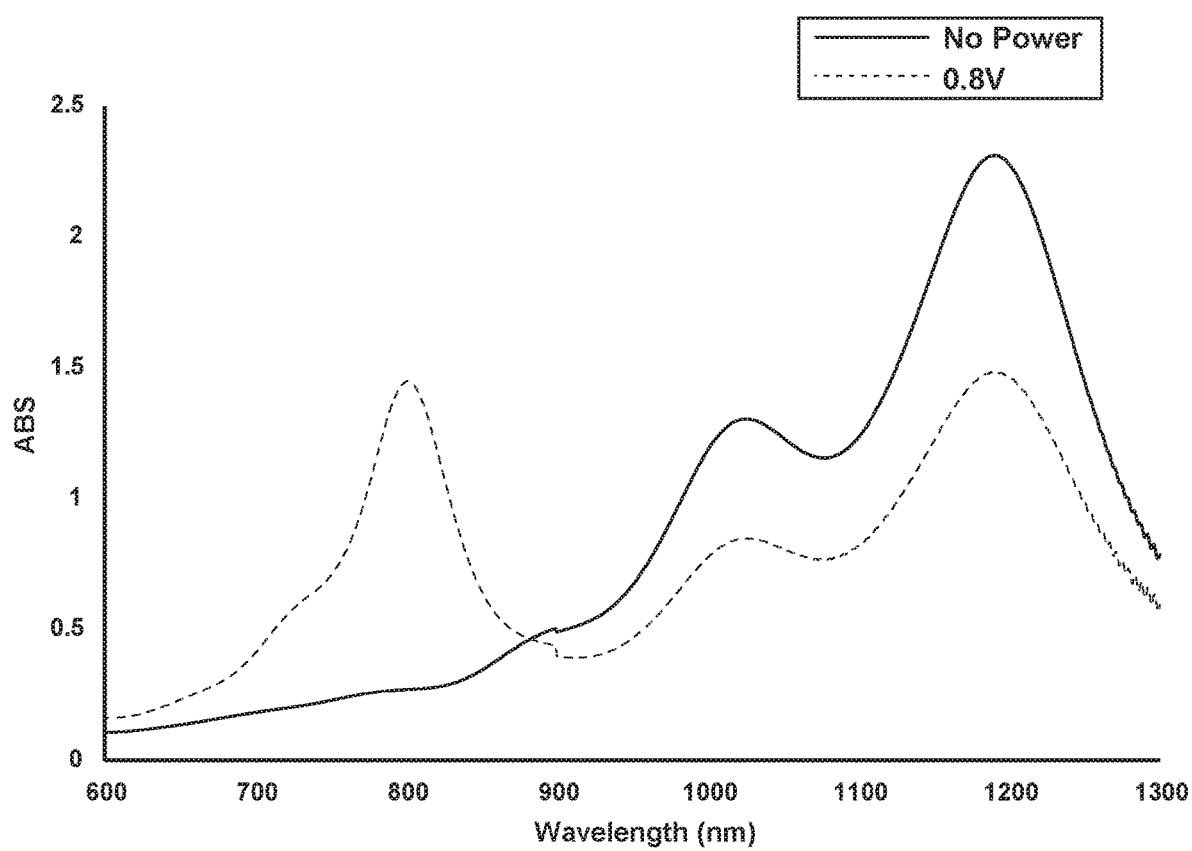
FIG. 5 is a plot of an absorbance spectrum of a triphenodithiazine-based device in a powered and unpowered condition according to one aspect of the present disclosure.

The electrochemical device of FIG. 5 included an electrochromic medium prepared by dissolving the following constituents in propylene carbonate: the triphenodithiazine compound of Formula (IV) at a concentration of 6 mM, Tinuvin® 384 15 mm (CIBA) pentyl 3-(3-tert-butyl-4-hydroxy-5-(2H-benztriazole-2-yl))propionate, 0.2% 4,4'-methylene bis(phenyl isocyanate) (MDI), 0.5 mM decamethyl ferrocene, 0.5 mM decamethyl ferrocenium tetrafluoroborate, 3.0 parts per million of dibutyl tin diacetate, and 43.3% by weight polymer solution from Example 1 of U.S. Pat. No. 9,500,927, issued Nov. 22, 2016 and entitled "Electrochromic Polyelectrolyte Gel Medium having Improved Creep Resistance and Associated Electrochromic Device," the contents of which is incorporated by reference herein in its entirety. FIG. 5 demonstrates the absorbance of the electrochemical cell for a range of wavelengths when no power is applied and when the device is powered with a potential of 0.8 Volts. When the electrochemical cell including the triphenodithiazine compound of Formula (IV) is powered, the absorbance of the device shows a new absorbance peak between about 700 nm to about 850 nm. The spectra of FIG. 5 demonstrate that the absorbance of an electrochromic cell utilizing a triphenodithiazine compound according to an aspect of the present disclosure can be selectively controlled by applying a voltage to the electrochromic device. The triphenodithiazine compounds of the present disclosure may find use in a wide range of devices including, but not limited to: electrochromic devices (e.g., mirrors, displays, windows), switchable photographic infrared (IR) camera filters, and other switchable NIR filter devices. As used herein, near infra-red or "NIR" refers to light with a wavelength within the range of about 700 nm to about 1400 nm, inclusive of endpoints. Light within the visible region of the electromagnetic spectrum has a wavelength within the range of about 390 nm to about 700 nm.

Each of the triphenodithiazine compounds described herein and depicted as chemical structures or formulas, e.g. Formulas (A)-(C) listed above, are shown as one resonance structure. As would be appreciated by one skilled in the art, the electrochemical compound M, $M_{reduced}$, and $M_{oxidized}$ are a blend of numerous difference resonance structures where the charge and/or radical electron is delocalized throughout the π network of electrons to form a final blended structure comprising each of the numerous different resonance structures. Any single resonance structure depicted herein is defined to include all of the corresponding resonance structures as would be appreciated and known by one skilled in the art.

The triphenodithiazine compounds according to the present disclosure can have a high absorbance in the near infrared region in at least one oxidation state relative to absorbance of radiation in the visible region of the electromagnetic spectrum. Preferably, the triphenodithiazine compounds of the present disclosure do not have significant absorbance in the visible region of the electromagnetic spectrum. In some aspects, the triphenodithiazine compound in the third oxidation state will yield an oxidized material that is colorless. The electrochromic devices 100 using these compounds are capable of reversibly attenuating the transmittance of radiation in the near infrared region of the electromagnetic spectrum, optionally without significantly affecting transmittance of radiation in the visible region.

The triphenodithiazine in the second oxidation state according to the present disclosure is electroactive as both an anodic material and cathodic material and can be reversibly oxidized and/or reduced to both the reduced material $M_{reduced}$ (triphenodithiazine in the first oxidation state) and the oxidized material $M_{oxidized}$ (triphenodithiazine in the third oxidation state) where at least one of these states are electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

In some aspects, the concentration of the triphenodithiazine in the second oxidation state as the anodic and cathodic material and its corresponding reduced and/or oxidized materials in the electrochromic medium 124 may each be from about 1 millimolar (mM) to about 500 mM. In some aspects, the concentration of triphenodithiazine in the second oxidation state and its corresponding anodic and/or cathodic materials in the electrochromic medium 124 may be from about 2 mM to about 100 mM.

In some aspects, triphenodithiazines in their various oxidation states are provided that exhibit good stability in electrochromic devices. Such materials may find use in mirror assemblies, architectural window assemblies, aircraft window assemblies, camera filter assemblies, and the like.

In another aspect, provided herein are electrochromic devices containing an electrochromic compound M that can act as both an anodic material and a cathodic material. When a voltage of sufficient magnitude is applied to an electrochemical cell including the electrochromic compound M, the electrochromic compound M can be oxidized to at least one oxidized state and can also be reduced to at least one reduced state. Because the electrochromic compound M is capable of being both oxidized and reduced when a voltage of sufficient magnitude is applied, the electrochromic compound M is acting as both the anodic material and the cathodic material. For example, with respect to the exemplary triphenodithiazine compound of FIG. 4, the electrochromic compound M in the second oxidation state can be reduced or oxidized to both a stable first oxidative state ($M_{reduced}$) and a stable third oxidation state ($M_{oxidized}$). As used herein, a compound in the "stable first oxidation state" and/or "stable third oxidation state" refers to a compound that is stable against decomposition while existing in the first or third oxidation states under UV and thermal cycling where stability is defined as maintained absorbance of given wavelengths over a period of time. According to an aspect of the present disclosure, an "applied voltage of sufficient magnitude" refers to from about 0.1 volts to about 3 volts. In some embodiments, the applied voltage of sufficient magnitude is about 800 mV to about 2.0 volts. In some aspects of the present disclosure, the electrochromic compound M that can act as both an anodic compound and a cathodic compound may be generated from a compound of Formula (I) as described herein. The electrochromic device may include, but is not limited to, a mirror, an architectural window, an aircraft window, a filter, a camera filter, or a battery.

In one aspect, an electro-optic cell for use in an electrochromic device is provided, the electro-optic cell including an electrochromic compound M having at least one oxidized state ($M_{oxidized}$) and at least one reduced state ($M_{reduced}$), and thus the electrochromic compound M acts as both the anodic material and the cathodic material in the cell. According to one aspect, the electrochemical compound M can be selected from a family of triphenodithiazine compounds represented by Formula (I):

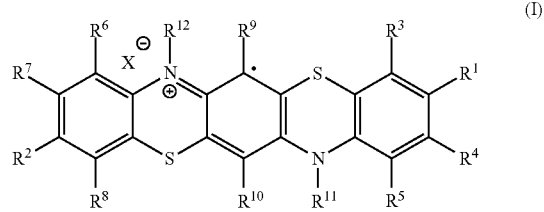

(I)

In Formula (I), $R^1$ and $R^2$ are individually alkyl, aryl, alkoxy, or aryloxy; $R^3$, $R^4$, $R^5$, $R^6$, $R^7$, $R^8$ are individually H, alkyl, aryl, alkoxy, or aryloxy; $R^9$ and $R^{10}$ are individually alkyl, or aryloxy, or where $R^1$ and $R^2$ are alkyl, $R^9$ and $R^{10}$ are individually H, alkyl, alkoxy, or aryloxy; $R^{11}$ and $R^{12}$ are individually alkyl, $(CH_2CH_2O)_nOCH_3$, or $(CH_2)_nN^+(R^{20})_3$ [X], wherein n is from 1 to 20; each $R^{20}$ is individually alkyl; and X is an anion.

In any of the aspects of the present disclosure, $R^1$ and $R^2$ may individually be $C_1$-$C_{12}$-alkoxy, a group of formula $R^{21}[O(CH_2)_x]_qO—$, or $C_6$-$C_{20}$-aryloxy, wherein $R^{21}$ is alkyl, x is 1, 2, 3, or 4, and q is an integer from 1 to 20. In any of the above embodiments, $R^9$ and $R^{10}$ may both be an $C_1$-$C_{12}$-alkoxy, a group of formula $R^{21}[O(CH_2)_x]_qO—$, or $C_6$-$C_{20}$-aryloxy, wherein $R^{21}$ is alkyl, x is 1, 2, 3, or 4, and q is an integer from 1 to 20.

In some aspects of the compound of Formula (I), $R^1$ and $R^2$ are individually alkyl; $R^3$, $R^4$, $R^5$, $R^6$, $R^7$, $R^8$ are individually H; $R^9$ and $R^{10}$ are individually H, alkyl, or alkoxy; $R^{11}$ and $R^{12}$ are individually $C_1$-$C_{12}$-alkyl, $—(CH_2)_nN^+(R^{20})_3$ [X], wherein n is from 1 to 10; each $R^{20}$ is individually $C_1$-$C_6$-alkyl; each $R^{20}$ is a $C_1$-$C_6$-alkyl; and X is an anion. This includes where $R^1$ and $R^2$ are individually $C_1$-$C_6$-alkyl; $R^3$, $R^4$, $R^5$, $R^6$, $R^7$, $R^8$ are individually H; $R^9$ and $R^{10}$ are individually H or $C_1$-$C_6$-alkoxy; $R^{11}$ and $R^{12}$ are individually methyl, ethyl, n-propyl, iso-propyl, n-butyl, iso-butyl, sec-butyl, t-butyl, $—(CH_2)_nN^+(R^{20})_3$ [X], wherein n is from 1 to 6; each $R^{20}$ is methyl or ethyl; and X is an anion.

In other aspects of the compound of Formula (I), $R^1$ and $R^2$ are individually alkoxy or aryloxy; $R^3$, $R^4$, $R^5$, $R^6$, $R^7$, $R^8$ are individually H, $C_1$-$C_{12}$-alkoxy, or $C_6$-$C_{12}$-aryloxy; $R^9$ and $R^{10}$ are individually C1-C12-alkoxy, or $C_6$-$C_{12}$-aryloxy; $R^{11}$ and $R^{12}$ are individually $C_1$-$C_{12}$-alkyl or $—(CH_2)_nN^+(R^{20})_3$ [X], wherein n is from 1 to 20; each $R^{20}$ is individually $C_1$-$C_6$-alkyl; and X is an anion. This includes where $R^3$, $R^4$, $R^7$, $R^8$ are individually $C_1$-$C_{12}$-alkoxy, or $C_6$-$C_{12}$-aryloxy; and $R^5$ and $R^6$ are H. This also includes where $R^1$ and $R^2$ are individually $C_1$-$C_{12}$-alkoxy; $R^3$, $R^4$, $R^7$, $R^8$ are individually $C_1$-$C_{12}$-alkoxy; $R^5$ and $R^6$ are H; $R^9$ and $R^{10}$ are individually $C_1$-$C_{12}$-alkoxy; $R^{11}$ and $R^{12}$ are individually $C_1$-$C_{12}$-alkyl or $—(CH_2)_nN^+(R^{20})_3$ [X], wherein n is from 1 to 20; each $R^{20}$ is individually $C_1$-$C_6$-alkyl; and X is an anion. In one illustrative aspect of the triphenodithiazine represented as Formula (I), $R^1$ and $R^2$ are individually methoxy, ethoxyl, n-propoxy, iso-propoxy, n-butoxy, sec-butoxy, or t-butoxy; $R^3$, $R^4$, $R^7$, $R^8$ are individually methoxy, ethoxyl, n-propoxy, iso-propoxy, n-butoxy, sec-butoxy, or t-butoxy; $R^5$ and $R^6$ are H; $R^9$ and $R^{10}$ are individually methoxy, ethoxyl, n-propoxy, iso-propoxy, n-butoxy, sec-butoxy, or t-butoxy; $R^{11}$ and $R^{12}$ are individually methyl, ethyl, n-propyl, iso-propyl, n-butyl, iso-butyl, sec-butyl, t-butyl, or $—(CH_2)_nN^+(R^{20})_3$ [X] wherein n is from 1 to 11; each $R^{20}$ is individually methyl, ethyl, n-propyl, iso-propyl, n-butyl, iso-butyl, sec-butyl, or t-butyl; and X is an anion.

In any of the aspects of the present disclosure, X may be $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CN)_2^-$, $N(CF_3SO_2)_2^-$, $C(CF_3SO_2)_3^-$, $N(SO_2C_2F_5)_2^-$, $Al(OC(CF_3)_3)_4^-$ or $BAr_4^-$, wherein Ar is a aryl or fluorinated aryl group. In one embodiment, $X^-$ is $^-BAr_4$ and Ar is a pentafluorophenyl group. In some aspects, X is a tetrafluoroborate or a bis(trifluoromethylsulfonyl) imide anion. When shown in any compound herein multiple X's may be a mixture of two or more such anions.

In addition to the triphenodithiazines described herein, the electrochromic medium may additionally include at least one solvent. In some aspects, the electrochromic medium may include an additional cathodic material in combination with the triphenodithiazine cathodic material. The additional cathodic material may be a viologen; a polymeric film such as various substituted polythiophenes, polymeric viologens; an inorganic film; or a solid transition metal oxide, including, but not limited to, tungsten oxide.

The electrochromic medium may include a mixture of the triphenodithiazines of Formula (I) in combination with other anodic (i.e. oxidizable) materials chosen and balanced to not disrupt the triphenodithiazine's ability to act as both an anodic and cathodic material. Illustrative anodic materials may include, but are not limited to, metallocenes, 5,10-dihydrophenazines, phenothiazines, phenoxazines, carbazoles, triphendioxazines, and related compounds. Anodic materials included in the electrochromic medium may include any one of a number of materials including ferrocene, substituted ferrocenes, substituted ferrocenyl salts, phenazine, substituted phenazines, phenothiazine, substituted phenothiazines, including substituted dithiazines, thianthrene, and substituted thianthrenes. Examples of anodic materials may include di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP), and bis (butyltriethylammonium)-para-methoxytriphenodithiazine (TPDT).

In some aspects, additional anodic materials may be used in combination with the triphenodithiazine anodic material. The additional anodic materials may include a polymer film, such as polyaniline, polythiophenes, polymeric metallocenes, or a solid transition metal oxide, including, but not limited to, oxides of vanadium, nickel, iridium, as well as numerous heterocyclic compounds, etc. It will be understood that numerous other anodic materials are contemplated for use including those disclosed in U.S. Pat. No. 4,902,108, issued Feb. 20, 1990 and entitled "Single-Compartment, Self-Erasing, Solution-Phase Electrochromic Devices, Solutions for Use Therein, and Uses Thereof,"; U.S. Pat. No. 6,188,505, issued Feb. 13, 2001 and entitled "Color-Stabilized Electrochromic Devices,"; U.S. Pat. No. 6,710,906, issued Mar. 23, 2004 and entitled "Controlled Diffusion Coefficient Electrochromic Materials for use in Electrochromic Mediums and Associated Electrochromic Devices,"; and U.S. Pat. No. 7,428,091, issued Sep. 23, 2008 and entitled "Electrochromic Compounds and Associated Media and Devices," the contents of which are incorporated herein by reference in their entirety.

In other aspects, at least one of the anodic electroactive materials include a substituted or unsubstituted phenazine compound. In another aspects, at least one of the anodic electroactive material includes a substituted or unsubstituted 2,7-dialkyl-5,10-dialkyl-5,10-dihydrophenazine compound. In another aspect, at least one alkyl group of the 5,10-dialkyl groups attached to the phenazine compound includes at least 4 carbon atoms and is devoid of any β hydrogen atoms, and at least one alkyl group of the 2,7-dialkyl groups attached to the phenazine compound includes at least 4 carbons. In another aspect, at least one alkyl group of the 5,10-dialkyl groups attached to the phenazine compound includes a substituted or unsubstituted neopentyl group, and at least one alkyl group of the 2,7-dialkyl groups attached to the phenazine compound includes a substituted or unsubstituted isopropyl, isobutyl, (2-ethylbutyl), or (2-propylpentyl) group. In some aspect, at least one alkyl group of the 5,10-dialkyl groups attached to the phenazine compound includes a neopentyl group, and at least one alkyl group of the 2,7-dialkyl groups attached to the phenazine compound includes a 2-ethyl-1-butanol group. In another aspect, at least one alkyl group of the 5,10-dialkyl groups attached to the phenazine compound includes a neopentyl group, and at least one alkyl group of the 2,7-dialkyl groups attached to the phenazine compound includes an isobutyl group.

In some aspects, a solvent of the electrochromic medium may include, but is not limited to, 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, γ-butyrolactone, γ-valerolactone; propylene carbonate (PC), ethylene carbonate; oligoethers; ionic liquids, such as pyridinium-, imidazolium-, and pyrrolidinium-compounds; and homogenous mixtures of any two or more such solvents. Where the solvent includes an ionic liquid, the counterion may be $F^-$, $Cl^-$, $Br^-$, $I^-$, $BF_4^-$, $PF_6^-$, $SbF_6^-$, $AsF_6^-$, $ClO_4^-$, $SO_3CF_3^-$, $N(CN)_2^-$, $N(CF_3SO_2)_2^-$, $C(CF_3SO_2)_3^-$, $N(SO_2C_2F_5)^-$, $Al(OC(CF_3)_3)_4^-$ or $BAr_4^-$ where Ar is a aryl or fluorinated aryl group, or other counterions used in ionic liquids. In one aspect, the counterion is $BAr_4^-$ and Ar is a pentafluorophenyl group. In another aspect, the electrochromic composition may include a solvent that includes propylene carbonate. While specific solvents have been disclosed as being associated with the electrochromic composition, numerous other solvents that would be known to those having ordinary skill in the art having the present disclosure before them are likewise contemplated for use. For example, in addition to the solvent, the electrochromic medium may be a gel composition.

In addition, the electrochromic medium may include other materials, such as light absorbers, light stabilizers, thermal stabilizers, antioxidants, oxygen scavengers, thickeners, viscosity modifiers, tint providing agents, redox buffers, and mixtures of any two or more such materials. Illustrative UV-stabilizers may include, but are not limited to, 2-ethyl-2-cyano-3,3-diphenyl acrylate; (2-ethylhexyl)-2-cyano-3,3-diphenyl acrylate; 2-(2'-hydroxy-4'-methylphenyl)benzotriazole, sold by Ciba-Geigy Corp. under the trademark Tinuvin P; 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); 2,4-dihydroxybenzophenone; 2-hydroxy-4-methoxybenzophenone; and 2-ethyl-2'-ethoxyanilide.

In some aspects, the electrochromic medium includes another cathodic material without an additional anodic material. In one aspect, the electrochromic medium further includes an anodic and/or cathodic color-stabilizing redox buffer. Suitable redox buffers include, among others, those disclosed in U.S. Pat. No. 6,188,505, issued Feb. 13, 2001 and entitled "Color-stabilized Electrochromic Devices," the contents of which are incorporated herein by reference in its entirety. Other examples of suitable anodic and cathodic redox buffers include, but are not limited to, metallocene (e.g., substituted ferrocenes), and metallocinium (e.g. ferrocinium) compounds.

In one aspect of the present disclosure, the electrochromic medium may further include a cross-linked polymer matrix, a free-standing gel, and/or a substantially non-weeping gel. The electrochromic medium may optionally be made up in layers and include a material attached directly to an electrically conducting electrode or confined in close proximity thereto which remains attached or confined when electrochemically oxidized or reduced. The electrochromic medium is optionally operable between substantially clear and substantially opaque states for at least one wavelength or at least one range of wavelengths of light.

In one aspect, at least one of the anodic electroactive materials has a concentration of at least 5 mM. In another aspect, at least one of the anodic electroactive materials has a concentration of about 2 mM to about 100 mM, about 5 mM to about 50 mM, about 7 mM to about 50 mM, or ranges between any two of these values (including endpoints). In another aspect, at least one of the anodic electroactive materials has a concentration of about 5 mM to about 7 mM. In another aspect, a second anodic electroactive material has a concentration of about 40 mM to about 50 mM.

In one aspect, at least one of the cathodic electroactive materials has a concentration of at least 50 mM. In another aspect, at least one of the cathodic electroactive materials has a concentration of about 50 mM to about 100 mM, about 60 to about 90 mM, about 70 mM to about 80 mM, or ranges between any two of these values (including endpoints). In yet another aspects, at least one of the cathodic electroactive materials has a concentration of about 10 mM to about 50 mM, about 20 to about 90 mM, about 30 mM to about 80 mM, or ranges between any two of these values (including endpoints).

Illustrative electrochromic devices employing the electrochromic compounds described herein may include, for illustrative purposes only, a window, an aircraft transparency, a mirror, a display device, a light filter, a camera filter, and the like. It will be understood that like or analogous elements and/or components, and/or methods referred to herein, may be identified throughout the drawings with like reference characters. In some aspects, the electrochromic device is an electrochromic window or an electrochromic mirror. In some aspects, the device is a vehicular interior electrochromic mirror. In some aspects, the device is a variable transmission electrochromic window. In some aspects, the device is an aircraft window system. Other applications of the electrochromic device includes screens for watches, calculators and computer display screens; eye wear such as eyeglasses and sunglasses; switchable mirrors, sun visors; automobile, architectural, aircraft, marine, and spacecraft windows; information display boards and digital billboards, and the like.

Figure 2:
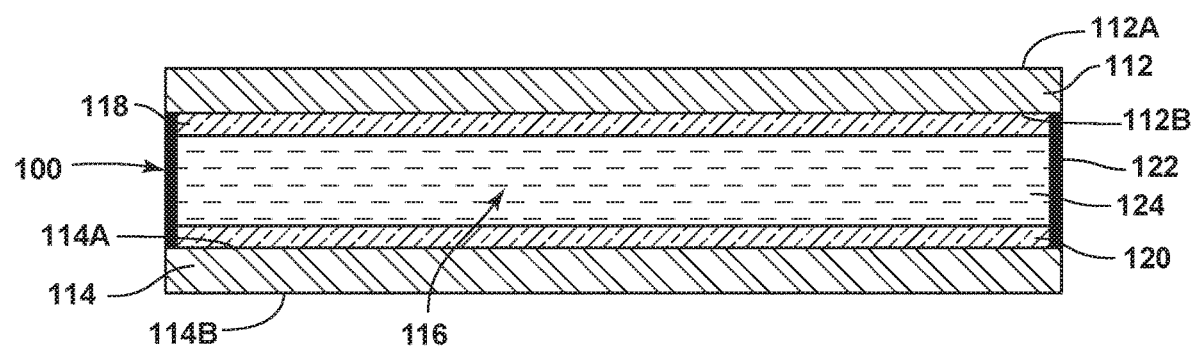
FIG. 2 is a cross-sectional schematic representation of an electro-optic cell for a non-limiting example of an electro-optic infrared filter according to one aspect of the present disclosure.

Referring to FIG. 2, in some aspects, the electrochromic device 100 is a switchable electro-optic infrared filter. In some aspects, the electro-optic infrared filter includes the first substrate 112 (also referred to as "substrate 1") defining the first surface 112A and the second surface 112B and the second substrate 114 (also referred to as "substrate 2") defining the third surface 114A and the fourth surface 114B. Each of the second and third surfaces (also referred to as "surface 2" and "surface 3" herein) can include the conductive surfaces 118, 120, such as ITO. The first and second substrates 112, 114 are positioned such that the second and third surfaces 112B, 114A face each other in a spaced apart relationship, with the sealing member 122 in between, forming the chamber 116 that is filled with the electrochromic medium 124. The electrochromic medium 124 is variably transmissive to one or more wavelength bands of light. Electrical contacts are made to the conductive layers 118, 120 coupled to the second and third surfaces 112B, 114A in order to provide electrical current in order to switch the electrochromic medium 124 between its substantially colorless and substantially colored states. In some aspects, the electro-optic infrared filter has a transmissivity in the colorless state (e.g., clear state), or substantially colorless state, of greater than 20%, 30%, 40%, 50%, 60%, 70%, or 80% for light having a wavelength in the near infrared region of the electromagnetic spectrum. In some aspects, the electro-optic infrared filter has a transmissivity in the colored state (e.g., opaque state), or substantially colored state, of less than 60%, 50%, 40%, 30%, 20%, 10%, 9%, 8%, 7%, 6%, 5%, 4%, 3%, 2%, 1%, 0.5%, or 0.1% for light having a wavelength in the near infrared region of the electromagnetic spectrum. Varying levels of transmissivity and opacity to near-infrared light may be obtained by partially transitioning the electro-optic infrared filter between the substantially colorless (i.e., transparent) and substantially colored (i.e., opaque) states.

Figure 3:
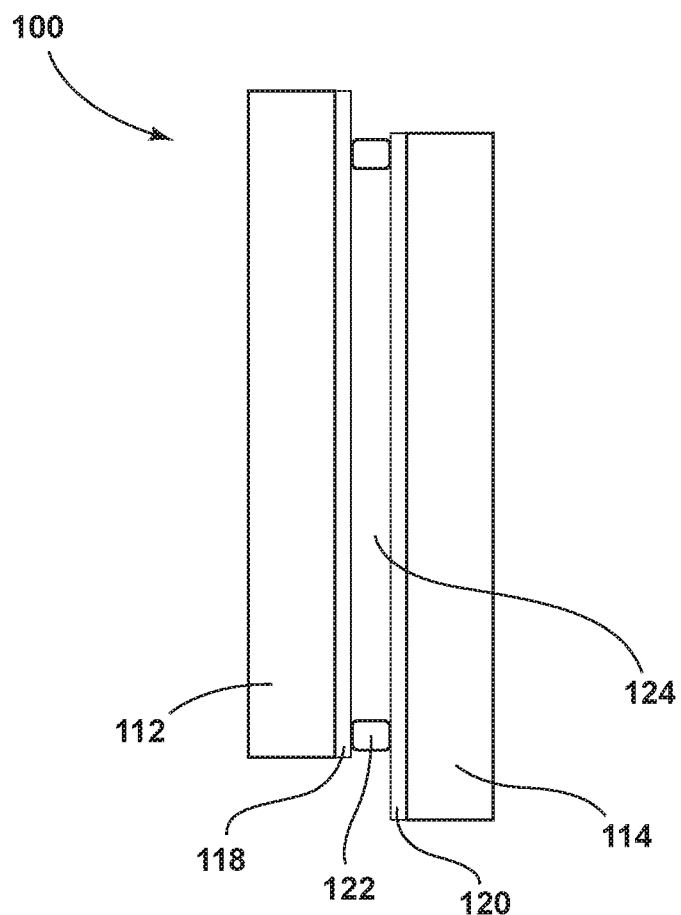
FIG. 3 is a cross-sectional schematic representation of an electro-optic cell for a non-limiting example of an electro-optic infrared filter according to one aspect of the present disclosure.

Referring now to FIG. 3, in some aspects, electrical contact to the conductive surfaces 118, 120 is simplified by offsetting the two glass substrates in order to expose electrode faces at each end of the cell. Many other electrical contact methods are well characterized in the prior art (e.g., as described in U.S. Pat. No. 8,274,729, issued Sep. 15, 2012 and entitled "Thin-Film Coatings, Electro-Optic Elements and Assemblies Incorporating these Elements," the contents of which are incorporated herein by reference in their entirety) and can be adapted for use herein. When the cell is powered, the conductive surface 118, 120 at which oxidation occurs is referred to as the anodic surface and the other of the conductive surface 118, 120 at which reduction occurs is referred to as the cathodic surface. When the cell is powered, the electrochromic compound M is oxidized at the anodic surface to form the $M_{oxidized}$ compound and the electrochromic compound M is reduced at the cathodic surface to form the $M_{reduced}$ compound.

Still referring to FIG. 3, in a non-segregated and freely diffusing fluid cell or device, the activated species (i.e., the $M_{oxidized}$ species and/or the $M_{reduced}$ species) diffuse to a region approximately midway between the anodic and cathodic surfaces (conductive surfaces 118, 120) and undergo an electron transfer that returns the species to the redox states they held prior to interaction with the energized anodic and cathodic surfaces (i.e., the conductive surfaces 118, 120). For example, with respect to the present example electro-optic cell described with reference to FIG. 4, the triphenodithiazine compound would return to the second oxidation state. Due to this diffusion process, the additive absorbance of the $M_{oxidized}$ and $M_{reduced}$ species is observed in transmission through the electro-optic cell when it is powered. The electrochromic device 100 has a single component chamber 116 where the electrochromic medium 124 includes an electrochromic compound M that can act as both the anodic and cathodic materials.

Figure 6:
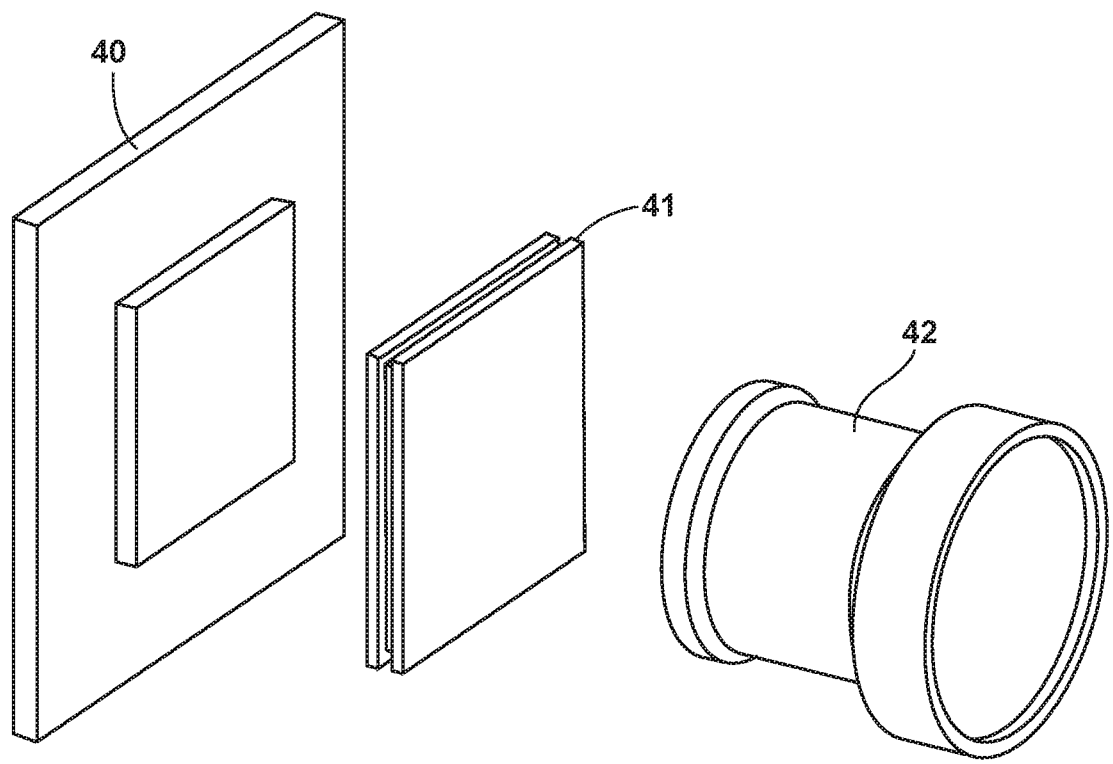
FIG. 6 depicts a non-limiting example of a camera imager assembly having a switchable electro-optic infrared filter according to one aspect of the present disclosure.

Referring now to FIG. 6, a switchable electro-optic near infrared filter 41 utilizing an electro-optic cell according to the present disclosure may be incorporated into a camera imager assembly. The filter 41 may be situated between an imager on a circuit board 40 and a lens assembly 42.

Figure 7:
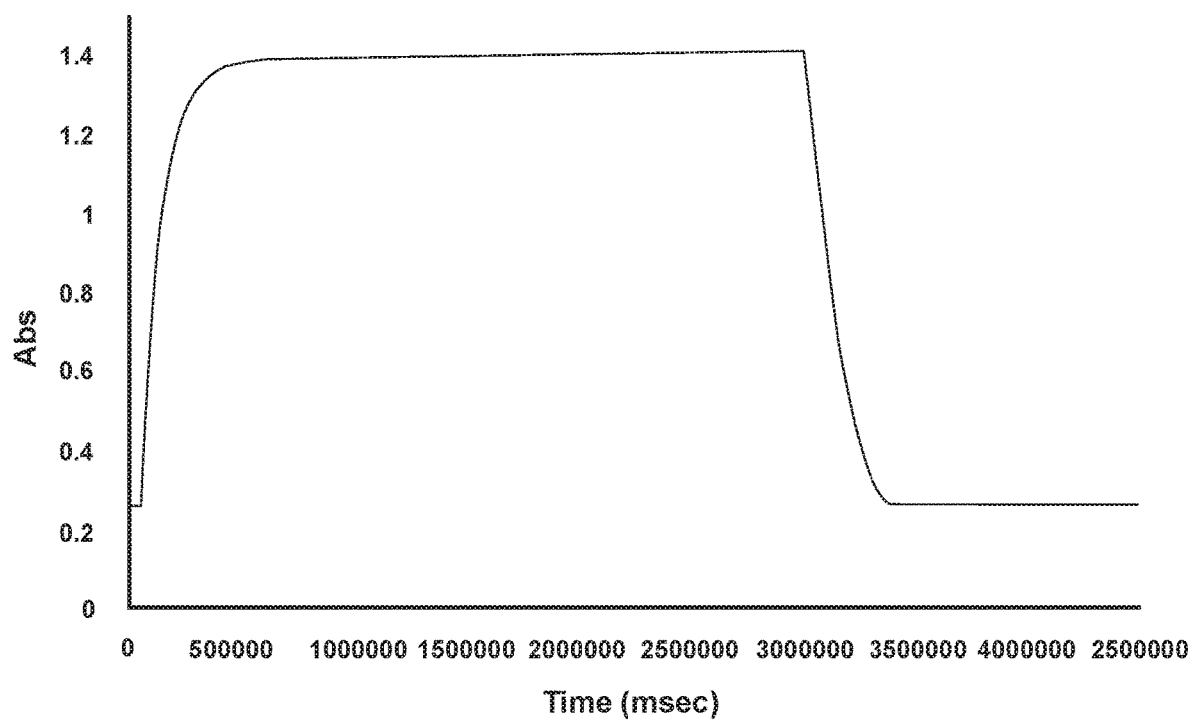
FIG. 7 is an absorbance plot for a triphenodithiazine device illustrating its switching time according to one aspect of the present disclosure.

Referring now to FIG. 7, an absorbance plot for the triphenodithiazine-based electrochemical device of FIG. 5 is illustrated. The absorbance plot of FIG. 7 demonstrates a switching time of about 30 seconds at 800 nm. One of the advantages of a one-component NIR filter according to the preset disclosure is a fast switching time relative to a segregated device. The switching time for a standard segregated device is generally on the order of 1 to 20 minutes while the switching time for a one-component device of the present disclosure of the same size using a triphenodithiazine as both the cathodic and anodic materials is on an order of seconds, generally about 25 to 100 seconds, as demonstrated by the example of FIG. 7. A segregated device is understood in the art to include a device that keeps the activated species (i.e., anodic species and/or cathodic species) in separate portions of the device where the anodic and cathodic materials are separately activated and undergo an electron transfer that returns them to the redox states they held prior to interaction with the energized electrode surfaces. While the electrochromic compound M of the present disclosure is described in the context of a one-component non-segregated device, in one aspect, the electrochromic compound M may also be used in a segregated device.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated aspects only. Modifications of the device will occur to those skilled in the art and to those who make or use the device. Therefore, it is understood that the aspects shown in the drawings and described above is merely for illustrative purposes and not intended to limit the scope of the device, which is defined by the following claims as interpreted according to the principles of patent law, including the Doctrine of Equivalents.

What is claimed is:

1. An electro-optic cell, comprising:
    an anodic surface and a cathodic surface;
    an electrochromic medium including an electrochromic compound M acting as both an anodic material and a cathodic material, wherein the electrochromic compound M includes at least one reduced state and at least one oxidized state; and
    wherein the electrochromic medium is capable of reversibly attenuating transmittance of light having a wavelength within a predetermined range, and
    wherein the electrochromic compound M comprises a compound of Formula (I):

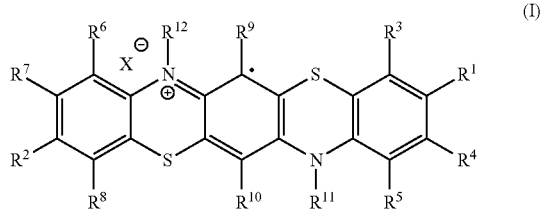

wherein:
    $R^1$ and $R^2$ are individually alkyl, aryl, alkoxy, or aryloxy;
    $R^3$, $R^4$, $R^5$, $R^6$, $R^7$, $R^8$ are individually H, alkyl, alkenyl, aryl, alkoxy, or aryloxy;
    $R^9$ and $R^{19}$ are individually H, alkyl, aryl, alkoxy, or aryloxy, or where $R^1$ and $R^2$ are alkyl, $R^9$ and $R^{19}$ are individually H, alkyl, alkoxy, or aryloxy;
    $R^{11}$ and $R^{12}$ are individually alkyl, $(CH_2CH_2O)_nOCH_3$, or $(CH_2)_nN^*(R_{20})_3[X]$, wherein n is from 1 to 20; each $R^{20}$ is individually alkyl; and
    X is an anion.

2. The electro-optic cell of claim 1, wherein the compound of Formula (I) is reduced to form the species of Formula (II):

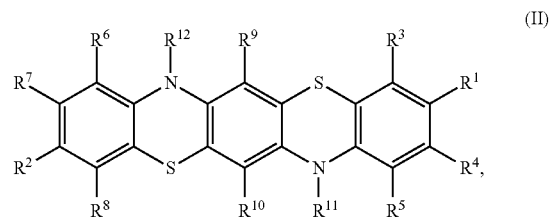

and
    the compound of Formula (I) is oxidized to form the species of Formula (III):

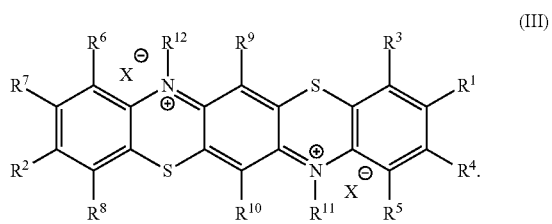

3. The electro-optic cell of claim 1, wherein X is $F^-$, $Cl^-$, $Br^-$, $I^-$, $BF_4^-$, $PF_6^-$, $SbF_6^-$, $AsF_6^-$, $Cl_4^-$, $SO_3CF_3^-$, $N(CN)_2^-$, $N(CF_3SO_2)_2^-$, $C(CF_3SO_2)_3^-$, $N(SO_2C_2F_5)_2^-$, $Al(OC(CF_3)_3)_4^-$ or $BAr_4^-$, wherein Ar is an aryl or fluorinated aryl group.

4. The electro-optic cell of claim 1, wherein the electrochromic medium is selectively reversible between a substantially transparent state and a substantially opaque state with respect to the light having a wavelength within a predetermined range.

5. The electro-optic cell of claim 1, wherein the predetermined range comprises at least a portion of a range of wavelengths between about 700 nm to about 1400 nm.

6. The electro-optic cell of claim 1, further comprising a chamber defined at least in part by the anodic surface and the cathodic surface, and wherein the electrochromic medium is disposed within the chamber and electrically coupled with both the anodic surface and the cathodic surface.

7. A device including the electro-optic cell of claim 1, wherein said device is selected from at least one of a window, an aircraft transparency, a mirror, a display device, a light filter, a camera filter, a watch, eyeglasses, sunglasses, sun visors, and digital billboards.

8. The electro-optic cell of claim 1, wherein the electrochromic compound M comprises 3,10-dimethoxy-7,14-(4-triethyl ammonium butyl) triphenodithiazine.

9. A non-segregated one-component electrochromic device, comprising:
    an anodic surface and a cathodic surface;
    a chamber defined at least in part by the anodic surface and the cathodic surface; and
    an electrochromic medium disposed within the chamber, the electrochromic medium including an anodic material and a cathodic material comprising an electrochromic compound M that is reversibly oxidizable to at least one oxidized state and reversibly reducible to at least one reduced state, and wherein the electrochromic compound M comprises a compound of Formula (I):

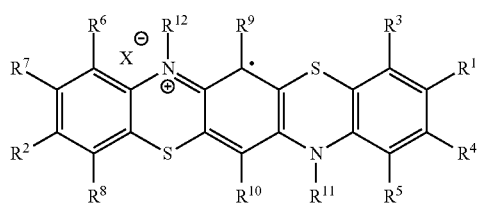

wherein:
- $R^1$ and $R^2$ are individually alkyl, aryl, alkoxy, or aryloxy;
- $R^3$, $R^4$, $R^5$, $R^6$, $R^7$, $R^8$ are individually H, alkyl, alkenyl, aryl, alkoxy, or aryloxy;
- $R^9$ and $R^{10}$ are individually H, alkyl, aryl, alkoxy, or aryloxy, or where $R^1$ and $R^2$ are alkyl, $R^9$ and $R^{10}$ are individually H, alkyl, alkoxy, or aryloxy;
- $R^{11}$ and $R^{12}$ are individually alkyl, $(CH_2CH_2O)_nOCH_3$, or $(CH_2)_nN^*(R_{20})_3[X]$, wherein n is from 1 to 20;
- each $R^{20}$ is individually alkyl; and
- X is an anion.

10. The non-segregated one-component electrochromic device of claim 9, wherein the compound of Formula (I) is reducible to the species of Formula (II):

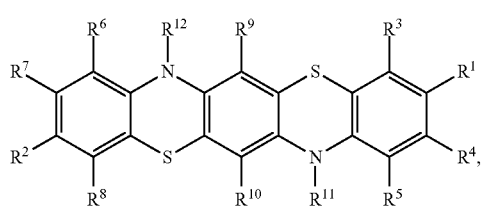

and
the compound of Formula (I) is oxidizable to the species of Formula (III):

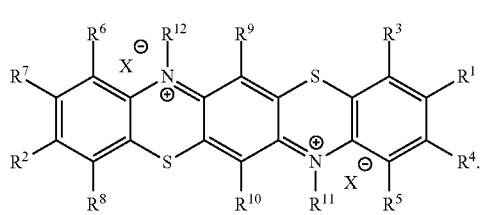

11. The non-segregated one-component electrochromic device of claim 9, wherein at least one of the oxidation states of the electrochromic compound M has an absorption spectrum that includes light having a wavelength within the range of about 700 nm to about 1400 nm.

12. The non-segregated one-component electrochromic device of claim 11, wherein the electrochromic medium is substantially transparent to light having a wavelength within the range of about 390 nm to less than about 700 nm.

13. The non-segregated one-component electrochromic device of claim 9, wherein the electrochromic medium is capable of reversibly attenuating transmittance of light having a wavelength within a predetermined range.

14. The non-segregated one-component electrochromic device of claim 13, wherein the electrochromic medium is selectively reversible between a substantially transparent state and a substantially opaque state with respect to the light having a wavelength within a predetermined range.

15. The non-segregated one-component electrochromic device of claim 9, wherein the electrochromic compound M comprises a compound of Formula (IV):

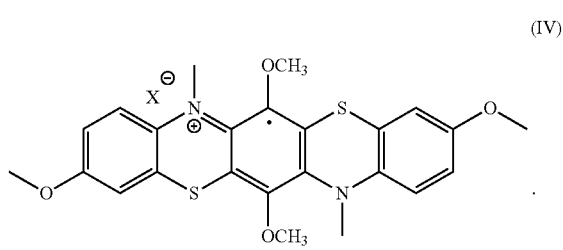

16. The non-segregated one-component electrochromic device of claim 9, wherein the electrochromic compound M comprises 3,10-dimethoxy-7,14-(4-triethyl ammonium butyl) triphenodithiazine.

17. An electrochromic medium for use in an electrochromic device, comprising:
an electrochromic compound of Formula (I):

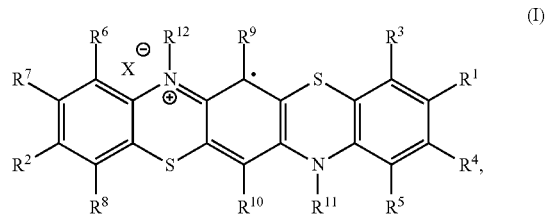

wherein the electrochromic compound of Formula (I) can be reversibly reduced to form a reduced species of Formula (II):

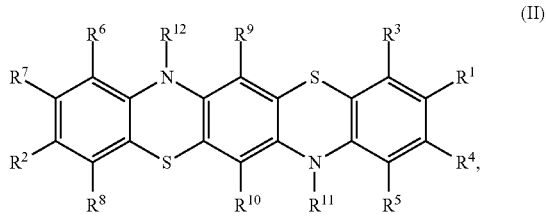

and
wherein the electrochromic compound of Formula (I) can be reversibly oxidized to form an oxidized species of Formula (III):

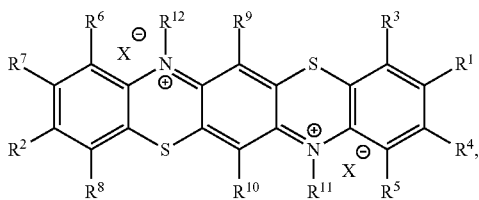

(III)

wherein:
- $R^1$ and $R^2$ individually alkyl, aryl, alkoxy, or aryloxy;
- $R^3$, $R^4$, $R^5$, $R^6$, $R^7$, $R^8$ are individually H, alkyl, alkenyl, aryl, alkoxy, or aryloxy;
- $R^9$ and $R^{10}$ are individually H, alkyl, aryl, alkoxy, or aryloxy, or where $R^1$ and $R^2$ alkyl, $R^9$ and $R^{10}$ are individually H, alkyl, alkoxy, or aryloxy;
- $R^{11}$ and $R^{12}$ are individually alkyl, $(CH_2CH_2O)_nOCH_3$, or $(CH_2)_nN^+(R_{20})_3[X]$, wherein n is from 1 to 20;
- each $R^{20}$ is individually alkyl; and
- X is an anion.

18. The electrochromic medium of claim 17, wherein at least one of the oxidation states of the electrochromic compound of Formula (I) does not significantly absorb light in a visible wavelength range from about 390 nm to about 700 nm.

19. The electrochromic medium of claim 17, wherein the electrochromic medium is selectively reversible between a substantially transparent state and a substantially opaque state with respect to light having a wavelength within a range of about 700 nm to about 1400 nm.

20. The electrochromic medium of claim 17, wherein the electrochromic compound includes a compound of Formula (IV):

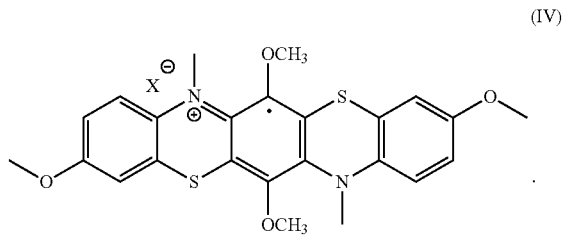

(IV)

* * * * *